United States Patent [19]

Santandrea et al.

[11] Patent Number: 5,474,166

[45] Date of Patent: * Dec. 12, 1995

[54] AUTOMATIC ADJUSTMENT OF PALLET WORKPIECE SUPPORT MEMBERS

[75] Inventors: Luciano Santandrea; Massimo Lombardi, both of Florence, Italy

[73] Assignee: Axis U.S.A., Inc., Marlborough, Mass.

[*] Notice: The portion of the term of this patent subsequent to May 26, 2009, has been disclaimed.

[21] Appl. No.: 291,116

[22] Filed: Aug. 16, 1994

Related U.S. Application Data

[63] Continuation of Ser. No. 72,767, Jun. 7, 1993, Pat. No. 5,346,058, which is a continuation of Ser. No. 994,147, Dec. 21, 1992, Pat. No. 5,255,778, which is a continuation of Ser. No. 699,913, May 14, 1991, abandoned, which is a division of Ser. No. 326,158, Mar. 20, 1989, Pat. No. 5,115,901, which is a continuation-in-part of Ser. No. 212,267, Jun. 27, 1988, abandoned.

[51] Int. Cl.⁶ .................................................... B65G 47/00
[52] U.S. Cl. ................... 198/345.3; 198/803.01; 198/346.1; 269/56
[58] Field of Search ............... 198/339.1, 345.1, 198/345.3, 465.1, 465.2, 465.3, 803.01, 803.2, 803.11, 803.3, 346.1, 346.2; 29/338, 56.6, 760, 784, 281.1; 269/56, 296; 294/119.1; 414/222, 225, 911; 410/38, 126

[56] References Cited

U.S. PATENT DOCUMENTS

| | | | |
|---|---|---|---|
| 3,880,074 | 4/1975 | Seifert | 101/38 A |
| 4,014,428 | 3/1977 | Ossbahr | 198/345 |
| 4,492,301 | 1/1985 | Inaba et al. | 198/472 |
| 4,520,919 | 6/1985 | Keitaro | 198/648 |
| 4,557,371 | 12/1985 | Yonezawa | 198/803.01 |
| 4,583,631 | 4/1986 | Yonezawa et al. | 198/345 |
| 4,626,160 | 12/1986 | Shiomi et al. | 414/222 |
| 4,667,804 | 5/1987 | Dubuit et al. | 198/345 |
| 4,681,212 | 7/1987 | Miller | 198/803.2 |
| 4,698,475 | 10/1987 | Lothenbach et al. | 198/803.01 X |
| 4,787,505 | 11/1988 | Tweedy | 198/803.01 |
| 4,803,882 | 2/1989 | Schonfeld et al. | 73/462 |
| 4,844,237 | 7/1989 | Petersen | 198/803.01 |
| 4,928,806 | 5/1990 | Anderson et al. | 198/345.1 |
| 5,060,781 | 10/1991 | Santandrea et al. | 198/345.1 |
| 5,099,979 | 3/1992 | Kehrel | 198/345.1 |
| 5,115,901 | 5/1992 | Santandrea et al. | 198/803.01 X |
| 5,244,082 | 9/1993 | Togashi | 198/803.11 X |
| 5,348,142 | 9/1994 | Nishimura et al. | 198/803.01 |

FOREIGN PATENT DOCUMENTS

| | | |
|---|---|---|
| 0149469 | 10/1985 | European Pat. Off. |
| 3338423 | 2/1983 | Germany |
| 58-31811 | 12/1992 | Japan |
| 1370232 | 10/1974 | United Kingdom |
| 2038671 | 5/1979 | United Kingdom |

*Primary Examiner*—D. Glenn Dayoan
*Attorney, Agent, or Firm*—Fish & Neave; Nicola A. Pisano

[57] ABSTRACT

An apparatus for automatically adjusting the distance between two support members for carrying workpieces of different dimensions. The support members are mounted on guides that are fitted to pallets that travel on conveyor transport systems for automatic production/assembly lines. In one embodiment the support members have a locking device that frictionally secure the support members in place on the pallet and can be unlocked for movement along the guide. A positioning unit engages the pallet so that the locking device is unlocked and the support members are engaged and translated to the desired locations under the control of a drive. In a second embodiment the support members are translated along and under the control of a threaded bar. A positioning unit engages the pallet to activate the threaded bar by rotating it to translate the support members to the desired locations. The support members are independently translated using one threaded bar and the drive for each support member. The location of the support members may be determined before adjusting the support members for the dimensions of the workpiece to be supported. Devices for bringing a pallet and the positioning unit together to make the adjustment are provided.

5 Claims, 10 Drawing Sheets

AUTOMATIC ADJUSTMENT OF PALLET WORKPIECE SUPPORT MEMBERS

CROSS REFERENCE TO RELATED APPLICATIONS

This is a continuation application of U.S. patent application Ser. No. 08/072,767, filed Jun. 7, 1993, now U.S. Pat. No. 5,346,058, which is a continuation application of U.S. patent application Ser. No. 07/994,147, filed Dec. 21, 1992, now U.S. Pat. No. 5,255,778, which is a continuation of U.S. patent application Ser. No. 07/699,913, filed May 14, 1991, abandoned, which is a division of U.S. patent application Ser. No. 07/326,158, filed Mar. 20, 1989, now U.S. Pat. No. 5,115,901, which is a continuation-in-part application of U.S. patent application Ser. No. 07/212,267, filed Jun. 27, 1988, abandoned, in the names of Luciano Santandrea and Massimo Lombardi and entitled Apparatus For The Automatic Adjustment Of Pallet Workpiece Support Members.

BACKGROUND OF THE INVENTION

This invention relates to improvements in pallet conveyor production line systems including pallets that have support members that are adjustable for carrying workpieces of different dimensions, and particularly to apparatus and methods for the automatic adjustment of the distance between support members of a pallet that is adapted to carry different sized workpieces.

Pallet conveyor systems are used in automatic production lines where workpieces are to be subjected to a sequence of operations at successive workstations. A workpiece that is to be assembled, machined, or operated on is placed on support members that are mounted on a pallet. The pallet is set upon a moving conveyor belt that will advance the pallet and the workpiece to a series of workstations that perform the sequence of desired operations to complete the production cycle. A plurality of pallets carrying a like plurality of workpieces are typically used.

The pallets are frictionally driven by the conveyor. As a workpiece is brought to a workstation, the pallet is stopped and the work station operation is performed. While stopped, the pallet may continue to rest on the moving conveyor in sliding contact, or may be lifted off the moving conveyor belt. Depending on the desired operation, the workpiece may be worked upon while resting on the support members of the pallet, or it may be removed from the support members, worked upon, and then returned to the support members. At the conclusion of the operation, the pallet is released or placed back on the belt to advance to the next workstation. The pallets thus move asynchronously, i.e., pallets upstream of a stopped pallet will advance until they are stopped behind a stopped pallet while the conveyor continues to advance, individually or in sets or groups, and accumulate in order to wait their turn at the workstation. Alternately, the pallets may move synchronously with respect to one another.

Pallet conveyor production lines are adapted for performing the same operations on workpieces that belong to the same family of workpieces and require the same machining operations, even though the workpieces may differ in certain dimensions. It is known to provide the workstations with automatic adjustment devices that can receive workpieces of different dimensions and adjust for the differences in order to perform properly the desired operation. However, to maximize efficiency of production, workpieces are usually grouped and processed in sets according to the uniformity of certain dimensions. This minimizes the amount of changing-time and thus increases the rate of through-put of finished parts.

One of the problems with conventional pallet conveyor systems is that the support members on the pallets are manually adjusted for the dimensions of the particular workpieces for the production cycle. Conventional pallets have mechanical connecting links or fasteners that must be manually loosened so that the support members can be moved, and then refastened to secure the workpiece support members to the pallet in the proper location. Thus, to change production from a set of workpieces having one uniform dimension to another, either the pallets must be adjusted while the pallets are advancing on the conveyor line or while pulled off the conveyor line. Alternately, the pallets may be replaced with a second set of pallets that are pre-adjusted for the dimensions of the next set of workpieces. Consequently, changing from one set of workpieces to another requires a significant slowdown or down-time in production.

Another problem with conventional production lines is that the manual adjustment procedure allows for error in the settings used from one pallet to the next. Consequently, the workpieces are not always properly or uniformly carried during the production cycle, which may result in differences in the quality of the finished products.

SUMMARY OF THE INVENTION

It is therefore an object of the present invention to provide an apparatus for automatically adjusting the position of the workpiece support members of a pallet to correspond to the dimensions of a workpiece.

It is another object of this invention to increase the efficiency of pallet conveyor production lines by rapidly and accurately adjusting the workpiece support members to the dimensions of the workpiece to be carried. It also is an object to provide for substantially the same spacing for the support members of pallets that are to carry workpieces of a set or group having certain uniform dimensions.

It is another object of this invention to provide an in-line support member adjustment apparatus and method that will not slow or interrupt production for workpiece change-over.

It is another object of this invention to provide a pallet with a locking means having a release mechanism that can be used to lock support members in place and easily unlocked to permit movement of the support members.

It is another object of this invention to provide a pallet with adjustable support members mounted on threaded bars and to provide a positioning unit for engaging the threaded bars to translate the support members to their desired locations.

It is a further object to determine the location of the support members relative to a predetermined location and thereafter adjusting the support members to the desired locations for a selected workpiece.

In accordance with this invention, there is provided an apparatus for the automatic adjustment of the distance between two workpiece support members of pallets to adjust for the different dimensions of the workpieces to be operated on by a given pallet conveyor production line. Broadly, the invention concerns a modified pallet and a positioning unit that are constructed to engage so that the positioning unit can be operated to move the support members to a desired position corresponding to the workpiece and, prior to and subsequent to engagement, the support members remain stationary in place on the pallet.

The pallet of the present invention includes at least two support members that are slideably mounted relative to the pallet and to each other, a guide for controlling the direction of travel of the first and second support members, and means for translating the first and second support members towards and away from each other along the guide within an extreme range of positions selected to accommodate a range of workpiece dimensions appropriate for the given production line. The guide also may support the weight of the support members in the loaded and unloaded condition.

The positioning unit of the present invention includes a means for engaging the means for translating the first and second support members of the pallet, and a means for driving the means for engaging so that the first and second support members can be translated relative to each other along the guide from a first relative position to a second relative position within the extreme range of positions under the control of the positioning unit.

Also included in the apparatus of the invention is a means for moving the pallet and positioning unit into and out of engagement so that when the pallet and positioning unit are in engagement, the means for translating and the means for engaging the means for translating are engaged whereby the means for driving can translate the first and second support members relative to one another to the selected or desired locations, and so that when the pallet and the positioning unit are out of engagement the means for translating and the means for engaging the means for translating are disengaged whereby the first and second support members are maintained in a fixed position relative to one another and the guide on the pallet.

For example, a vertical translation device may be provided to move the pallet and the positioning unit in engagement. In the preferred embodiment, the translation device is a lifting means for raising and lowering the pallet between a lower position resting on the conveyor of the conveyor line and a higher position above the conveyor line. The higher position is adapted to bring the pallet into contact with the positioning unit as described hereinbelow. An alternate embodiment provides lowering the positioning unit onto the pallet.

In a first embodiment of the present invention, the pallet includes locking means so that each support member can be secured in place with no movement relative to the pallet, for example, at times other than when the support members are to be adjusted. The locking means includes a release mechanism to unlock the support members so that they can be moved relative to the pallet into a desired position and lock the support members in place. In the preferred embodiment, each support member has a separate locking means. In alternate embodiments, one locking means may be used for all support members.

The positioning unit of the first embodiment of the present invention comprises a release means for actuating the release mechanism of the locking means of the pallet so that the support members can be translated. The positioning unit also includes a movable carriage that is adapted for engaging and interconnecting with a support member, and a drive means for translating the carriage so that when the pallet and positioning unit are interconnected and the locking means is unlocked, movement of the carriage will move the support member of the pallet along the guide accordingly. In the preferred embodiment, the carriage has a bushing that is adapted to interconnect with a pin protruding from a support member.

In operation, adjustment of the support members in accordance with the first embodiment of the invention is carried out as follows. The positioning unit is placed at a convenient location, preferably in-line with the production line, more preferably prior to where the workpiece is first placed on the pallet. The pallet is advanced below the positioning unit and raised from its lower position to the higher position. As the pallet approaches the higher position, the releasing means of the positioning unit contacts the locking means to activate the release mechanism to unlock the support member to permit the support member to translate.

At about the same time (or before or after), the carriage of the positioning unit makes contact with and engages a portion of the support member, thereby interconnecting the positioning unit carriage and the support member of the pallet. The drive means of the positioning unit is then actuated to move the carriage, and hence, the support member, to the position associated with the particular dimensions for the workpiece that is to be placed on the pallet. Once the support member is in the proper location, the drive means is stopped and the pallet is lowered, whereby the carriage and the releasing means respectively disengage from the support member and the locking means, and the locking means again locks the support member relative to the pallet. Once in the lower position, the workpiece may be loaded onto the pallet, and the pallet advanced to begin the production cycle.

A microprocessor may be conventionally used to control the alignment and movement of the various elements of the apparatus, to identify the dimensions of the workpiece, and to control the positioning unit drive means accordingly.

In the preferred first embodiment, the positioning unit comprises one releasing means, carriage, and bushing means for each support member so that when the pallet is raised, each support member is released and engaged by a corresponding bushing and the support members can be adjusted simultaneously or independently.

In an alternate first embodiment, the positioning unit may comprise only one carriage and bushing so that only one support member is moved at a time. In this embodiment, moving more than one support member would require multiple cycles under the positioning unit. In another alternate first embodiment, the positioning unit may have one carriage, the carriage having two bushings that are spaced apart, whereby one support member is engaged and adjusted by one bushing and the other support member is engaged and adjusted by the other bushing. In another alternate first embodiment, the positioning unit may be adapted to move downwardly onto the pallet to engage and adjust the support members.

The positioning unit drive means may comprise a motor, preferably a stepper motor, that can rotate a screw mechanism with precise control to advance or retract a carriage along the screw to an infinite number of intermediate positions within a range of extreme positions. Thus, the drive means permits precise automatic adjustment of the support members for a large number of workpieces having certain uniform dimensions. It also provides for consistent positioning from pallet to pallet for identically dimensioned workpieces. Computer control of the drive means enhances the automation and precision of operation.

In accordance with a second embodiment of the present invention, the pallet is modified in a different manner than in the first embodiment as follows. The support members are secured to sliding blocks that have a threaded surface. The blocks are mounted on a guide that includes a threaded bar that engages and cooperates with the threaded surfaces of the blocks. The blocks slide or translate along the guides of the pallet in response to the rotation of the threaded bar. Means for rotating the threaded bar is provided.

In the preferred second embodiment, a separate threaded bar is used for each support member and sliding block arrangement and the sliding blocks have internally threaded passageways through which the threaded bars pass so that the support members may be independently moved. The threaded bars are preferably mounted in a housing of the pallet to be rotatable and in axial alignment. The threaded bars are rigidly secured to respective toothed gears that rotate in a fixed plane around a fixed point and are adapted to engage corresponding toothed gears on the positioning unit as described below for controlled rotation of the threaded bars and movement of the support members.

The threaded bars, gears, and sliding blocks are preferably substantially enclosed by the housing. The housing includes an aperture through which the support members extend and move along the pallet. There also is an aperture arranged proximate to each toothed gear so that the corresponding toothed gears of the positioning unit can engage the pallet gears in the housing. The housing substantially protects the support member interconnections from damage or clogging due to extraneous material.

In this second embodiment, movement of the support members is substantially minimized except during intentional adjustment of the members. This occurs as a result of the forces between the support members on the housing and the threaded bars and the threaded surfaces of the sliding blocks which combine to create a threshold frictional force that, under normal pallet conveyor operations, substantially prevents the support members from moving. When the support members are supporting a workpiece, the frictional forces are increased, thus further minimizing the likelihood of any unintended movement of the support members. However, the frictional forces are not sufficient to prevent intentional movement of the support members under the control of the positioning unit as described below.

The positioning unit of the second embodiment of the invention includes toothed gears in relatively fixed positions that are adapted to pass through the housing apertures and engage the toothed gears of the pallet. The gears thus remain in a fixed location and rotate about their axes to rotate the threaded bars to move the support members. In this embodiment, each positioning unit toothed gear is controlled by separate motor so that each gear, and hence, each support member, can be independently moved. Each gear also has an adapting motion to facilitate engagement of the gears before torque is applied to move the support members.

The positioning unit also may include means for determining the location of the support members relative to a predetermined location prior to adjusting the location of the support members. This information can be used to enhance the speed, accuracy and efficiency in adjusting the support members to the proper locations. Preferably, the means includes one movable sleeve mounted on a shaft associated with each support member. The sleeve is advanced from a preselected location until it contacts an outward surface of the support member. The distance is then calculated and the location of the support member is determined. The positioning unit then can calculate the distance and direction that the support member is to be moved to be in the proper location, and then actuate the motor to advance the gears to move the support member accordingly. The means for determining the location of the support members also may be used with any embodiment of the present invention.

In operation, adjustment of the support members in accordance with the second embodiment of the invention is carried out as follows. The positioning unit is placed at a convenient location, preferably in-line with the production line, more preferably prior to where the workpiece is first placed on the pallet. The pallet is advanced below the positioning unit and raised from its lower position to the higher position. As the pallet approaches the higher position, the toothed gears of the positioning unit and the pallet housing engage.

As or after the gears have engaged, the means for determining the location of the support members determines their location, preferably by advancing the movable sleeves until the sleeves contact the respective support members and measuring the distance respectively travelled from their predetermined locations. The determined distances are then used to create appropriate control signals for actuating the separate motors to rotate the respective gears to place the support members in the proper locations.

After the support members are in the proper location, the pallet is lowered, whereby the gears disengage, whereupon the support members will remain in place. Once in the lowered position, the workpiece may be lowered onto the support members and the pallet advanced to begin the production cycle.

The pallet of the present invention also may be equipped with a means for lifting the workpiece rapidly, to take it to a workstation for operation, and subsequently return the workpiece to the pallet. This device reduces the amount of time required to perform the operation at the workstation as compared to the time required for the workstation to perform the operation while the workpiece is held by the pallet.

A microprocessor may be conventionally used to control the alignment and movement of the various elements of the apparatus, to identify the dimensions of the workpiece and the prior position of the support members, and to control the positioning unit movements.

Thus, the modified pallets and the positioning unit of the present invention provide for rapid, accurate and repeatable adjustments of workpiece support members, whether successive workpieces are of the same or different dimensions.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
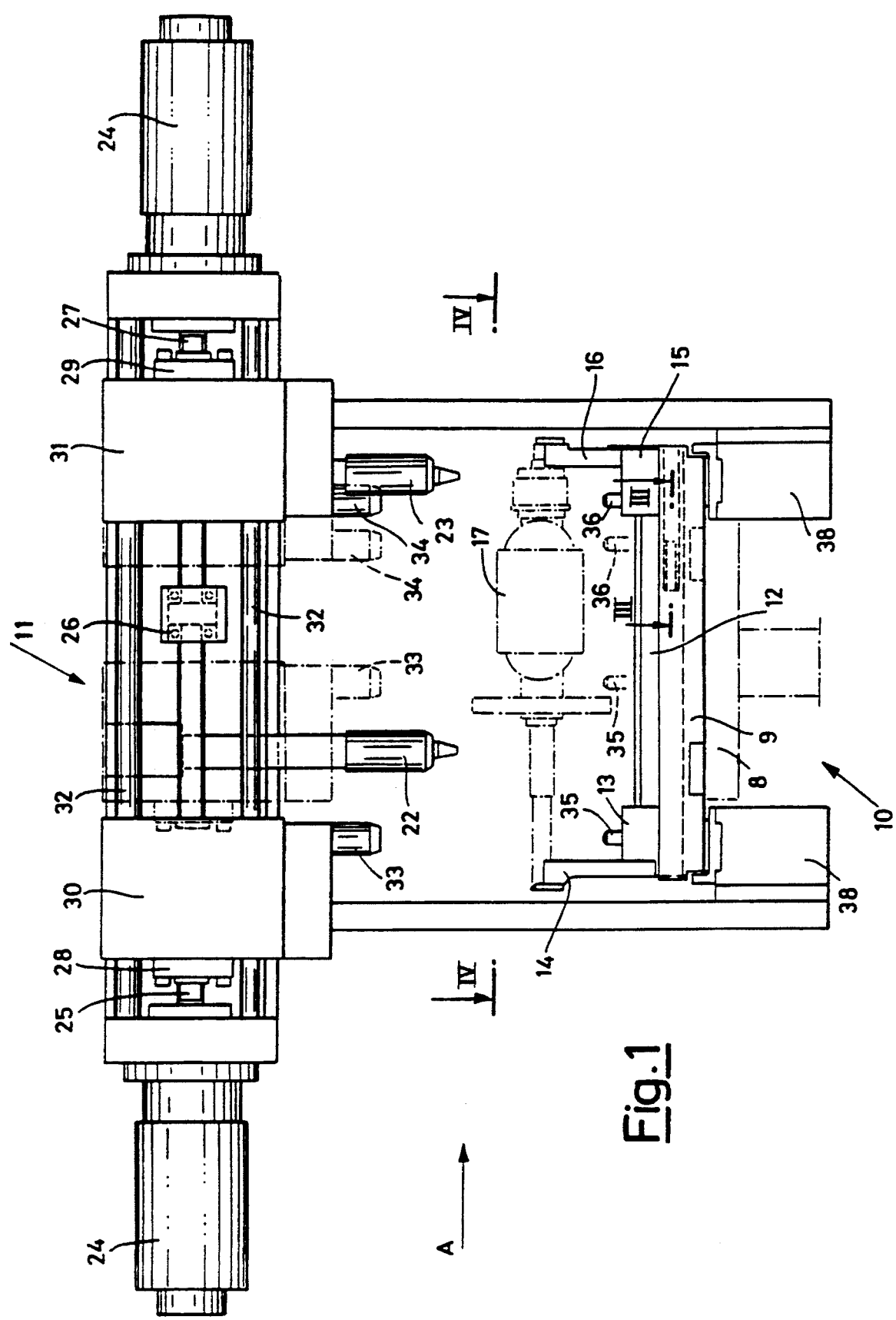
FIG. 1 is a front view of an illustrative first embodiment of the pallet and positioning unit of the present invention.
Figure 5:
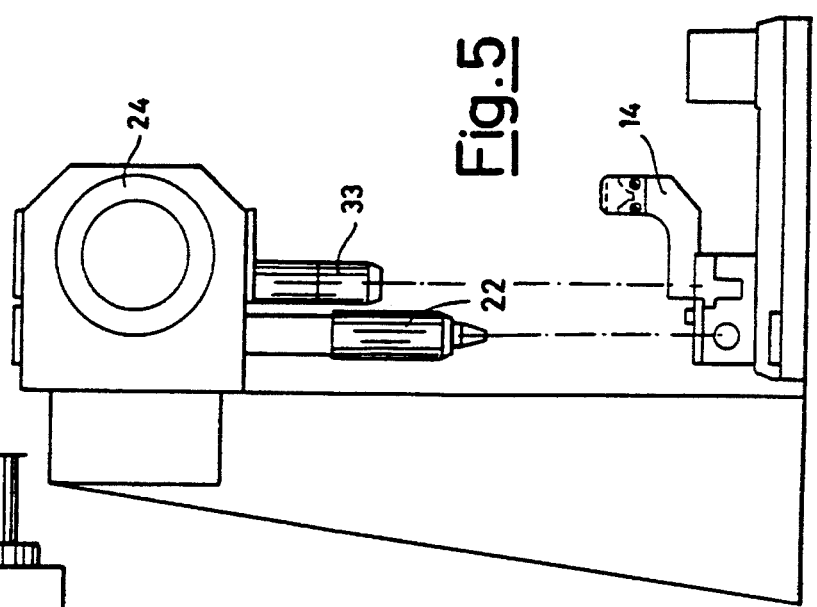
FIG. 5 is a side view of the embodiment of FIG. 1.

The following discussion refers to a single pallet, but it is to be understood that the discussion extends to a plurality of similar pallets, each of which cooperates with the positioning unit.

As shown in FIGS. 1–5, one embodiment of this invention comprises pallet 10 and positioning unit 11. Pallet 10 includes plate 9 and guide channels 12, mounted on plate 9, adapted for slideably receiving support members 13 and 15. Support members 13 and 15 have respective arms 14 and 16 that are adapted to support workpiece 17 as it is transported from workstation to workstation in the production cycle. In the preferred embodiment, workpiece 17 comprises an armature for an electric motor and the production line machines armatures.

Figure 3:
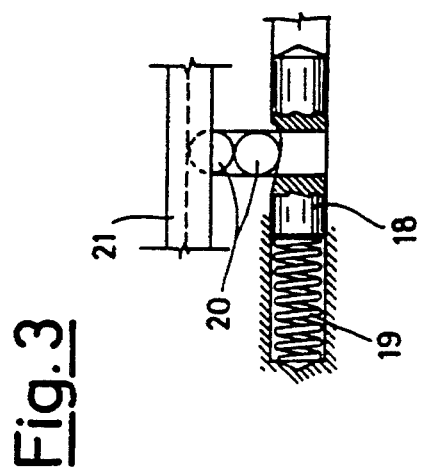
FIG. 3 is a cross-sectional view of a locking means of the embodiment of FIG. 1.
Figure 4:
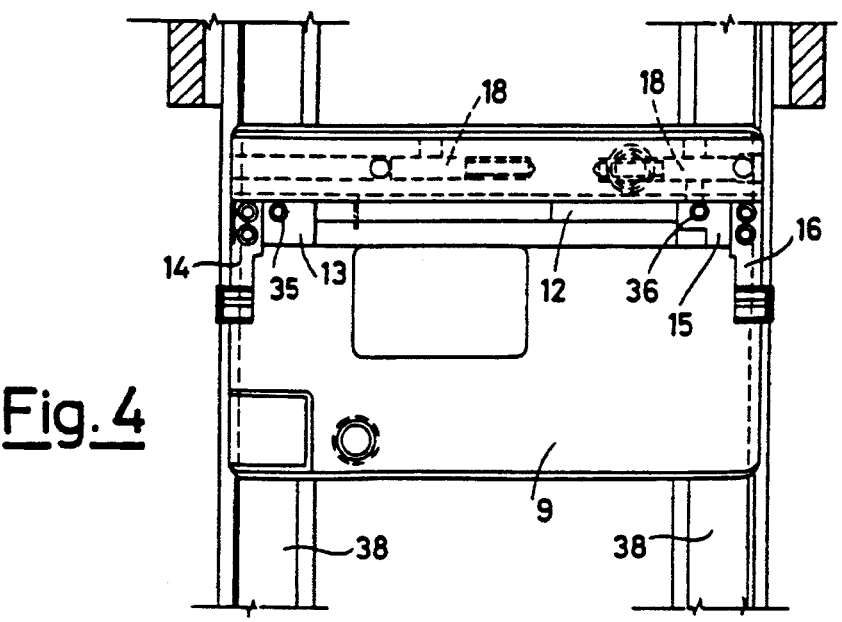
FIG. 4 is a top sectional view taken along line III—III of FIG. 1.

Each support member has an associated locking means for locking the support member in the programmed position, preferrably a friction locking mechanism, including a release mechanism that can be activated to unlock the support member, preferably overcoming the frictional locking force. The locking mechanism may be operated independently or simultaneously. Referring to FIG. 3, such a locking system includes wedge 18 urged by spring 19 against element 20 that is inserted in a slot obtained in small plate 21 that is integral to the support member.

Figure 2:
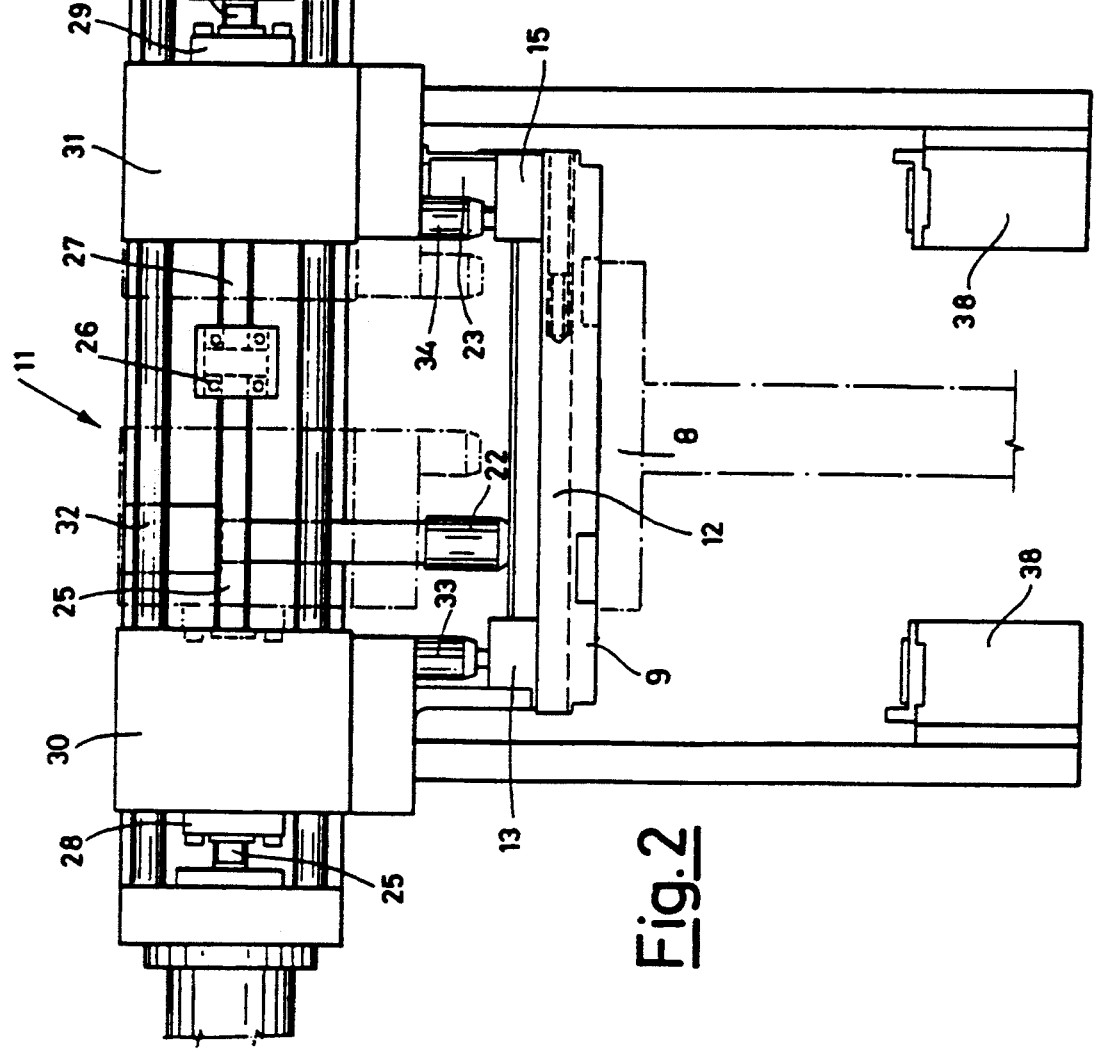
FIG. 2 is a front view of the embodiment of FIG. 1 showing the pallet and positioning unit engaged.

Referring to FIGS. 2 and 3, actuating the release mechanism of the locking means occurs by raising pallet 10 until pins 22 and 23 extending downwardly from positioning unit 11 contact and translate respective wedges 18 to overcome the action of springs 19. This action releases locking element 20 from the slot of small plate 21, thereby removing the frictional force locking the support members in place and enabling the displacement of support members 13 and 15. At this point, support members 13 and 15 may be moved by positioning unit 11 to the desired position along guides 12. Pins 22 and 23 may be fixedly mounted on positioning unit 11 to correspond to the fixed locations of locking means wedges 18 on pallet 10.

In an alternate embodiment (not shown) the locking mechanism could be mounted on the support member and the cooperating slot located in the pallet so that the lock translates with the support member. In this embodiment, pins 22 and 23 could be made separate projections extending from carriages 30 and 31 at locations corresponding to the location of the lock on the support members. It also is contemplated that pins 22 and 23 could be disposed interior to bushings 33 and 34 (described below) and the locking means located interior to the portions of the support members that will be engaged by bushings 33 and 34.

Positioning unit 11 also includes two actuators 24 that control the rotation of respective screws 25 and 27 that are coaxial and face each other on a common rest 26 on which they are fitted with bearings (not shown). Screws 25 and 27 engage respective interiorly threaded bosses or apertures 28 and 29 integral to carriages 30 and 31. Carriages 30 and 31 are thus driven by the rotation of screws 25 and 27 along guides 32.

Carriages 30 and 31 have respective bushings 33 and 34 having receptacles that are adapted to engage pins 35 and 36 of support members 13 and 15 respectively, thereby interlocking carriages 30 and 31 with support members 13 and 15. When engaged, movement of carriages 30 and 31 along guides 32 will displace support members 13 and 15 along guide channels 12. Actuators (drive means) 24 control the movement and position of carriages 30 and 31 throughout the full range of travel. This provides the ability to place the carriages in a reference position, e.g., corresponding to the initial position of the support members, and then move the carriages and the engaged support members to a desired, programmed position, e.g., corresponding to the dimensions of the workpiece.

Assuming the first workpiece 17 is to be replaced with a second workpiece having different dimensions, the operation proceeds as follows. First workpiece 17 is removed from arms 14 and 16 by actuators (not shown). To displace support members 13 and 15, it is necessary that no workpiece 17 be resting on arms 17 and 19. The position of the pallet support members 13 and 15 are determined and carriages 30 and 31 are moved to corresponding positions. Pallet 10 is lifted from a lower position on conveyor belt 38 by lifting means 8 and piston 37 and is taken to a higher position (shown in FIG. 2) where pins 22 and 23 engage the corresponding respective wedges 18 of support members 13 and 15, pushing them and compressing springs 19. In this way, small plates 21 are released from the locking elements 20, thereby allowing support members 13 and 15 to slide along guide channels 12.

At about the same time, or before or after, bushings 33 and 34 of carriages 30 and 31 engage pins 35 and 36 as shown in FIG. 2. Thus, support members 13 and 15 can be translated by operating one or both of actuators 24 as illustrated by the dashed lines in FIG. 2 representing the minimum distance between carriages and the full lines representing the maximum distance.

After the carriages and support members have been moved to the desired, programmed positions, pallet 10 is lowered onto conveyor 38. As pallet 10 is lowered, pins 22 and 23 disengage from their respective locking means release mechanisms so that wedges 18 are again forced against elements 20 by springs 19, thereby locking support members 13 and 15 into position. Carriages 30 and 31 may be left in the recently programmed position to begin again the releasing and repositioning operations if it becomes necessary to modify the distance between arms 14 and 16 to machine a new workpiece 17.

Figure 6:
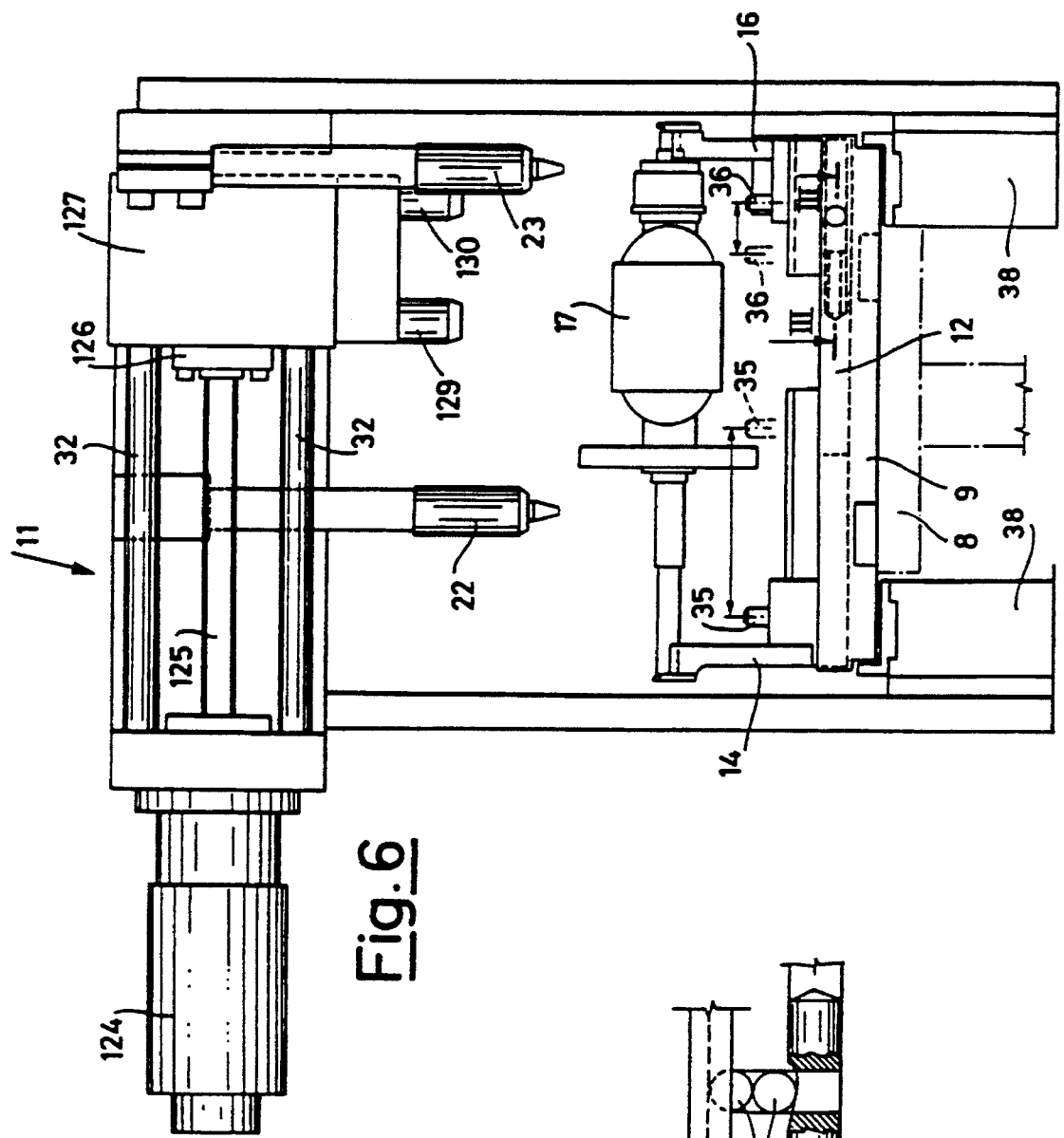
FIG. 6 is a front view of a second illustrative embodiment of the pallet and positioning unit of the present invention.
Figure 7:
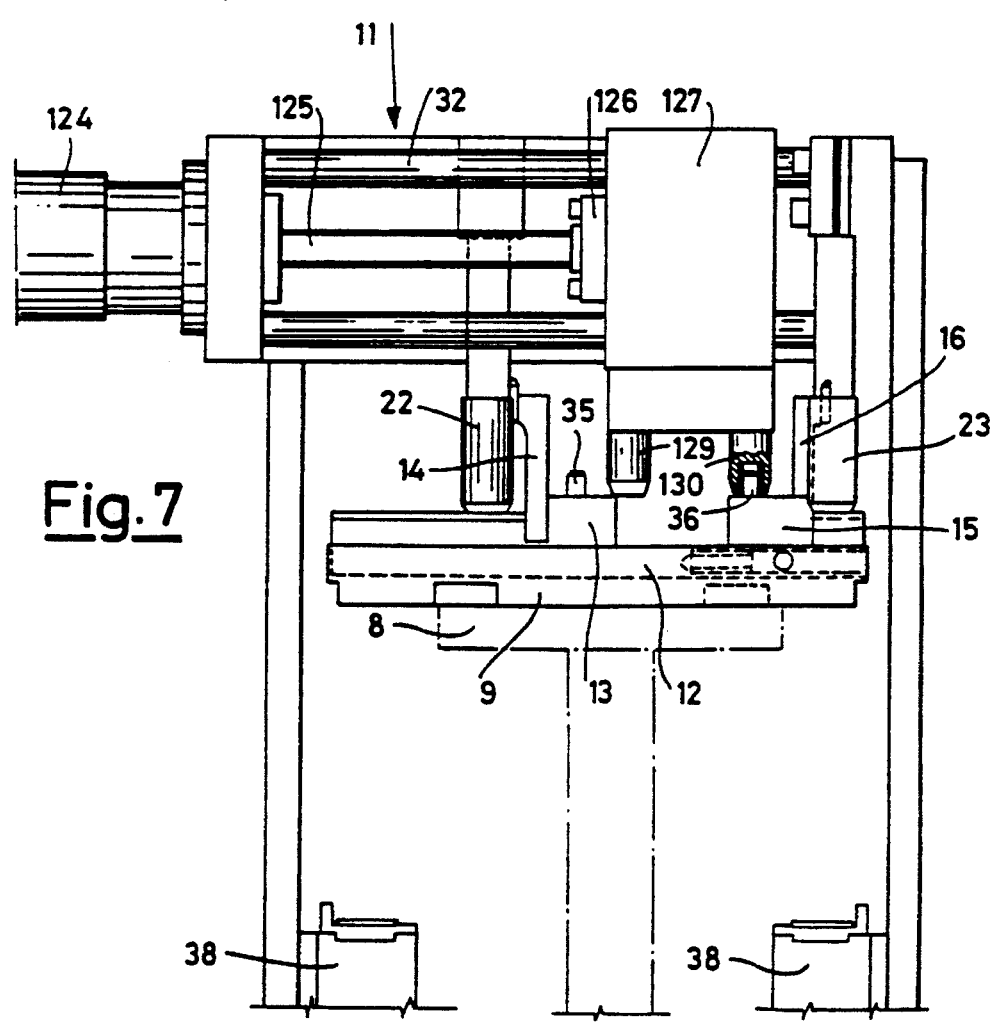
FIG. 7 is a front view of the embodiment of FIG. 6 showing the pallet and positioning unit engaged.
Figure 8:
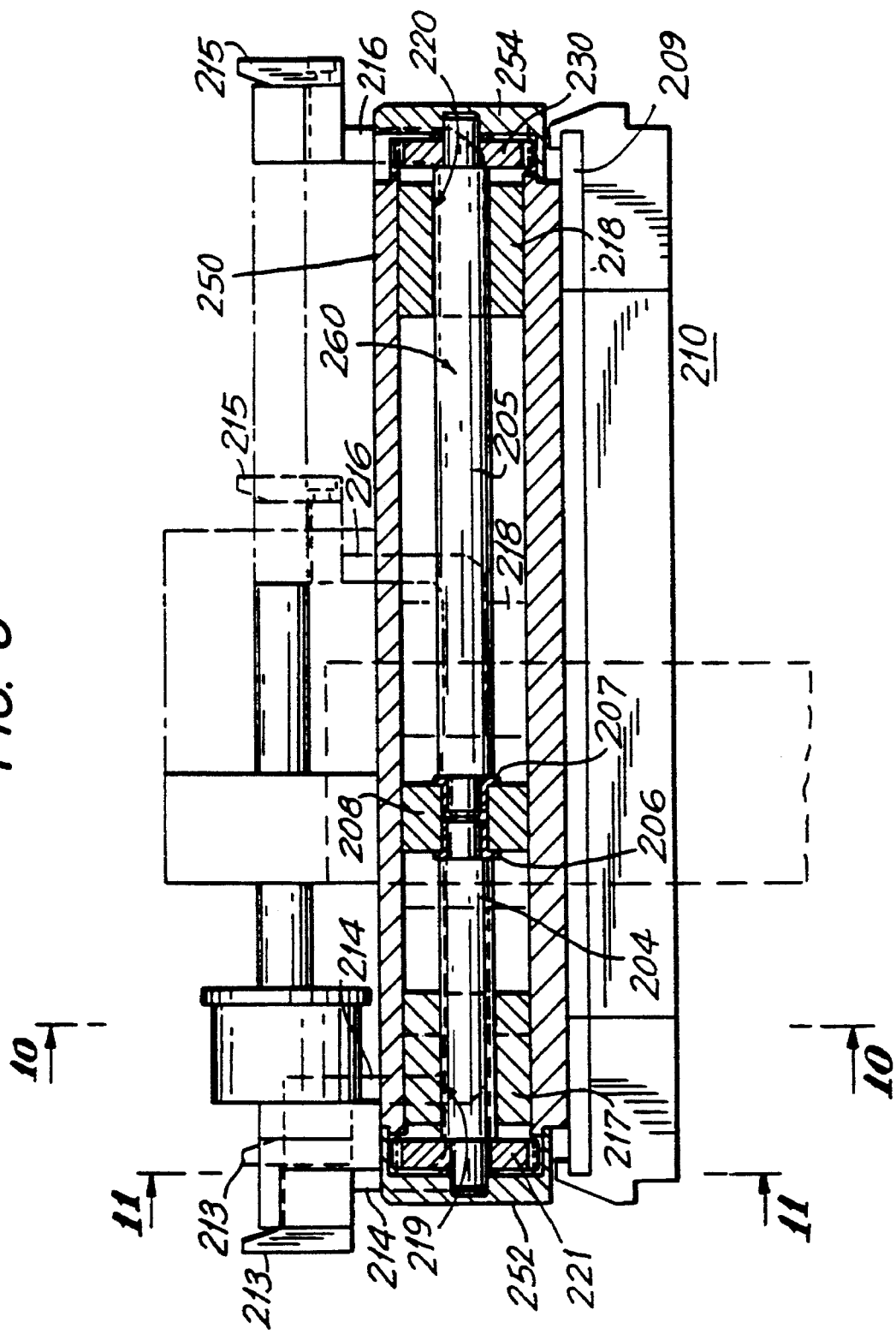
FIG. 8 is a front sectional view of a second embodiment of the pallet of the present invention.
Figure 9:
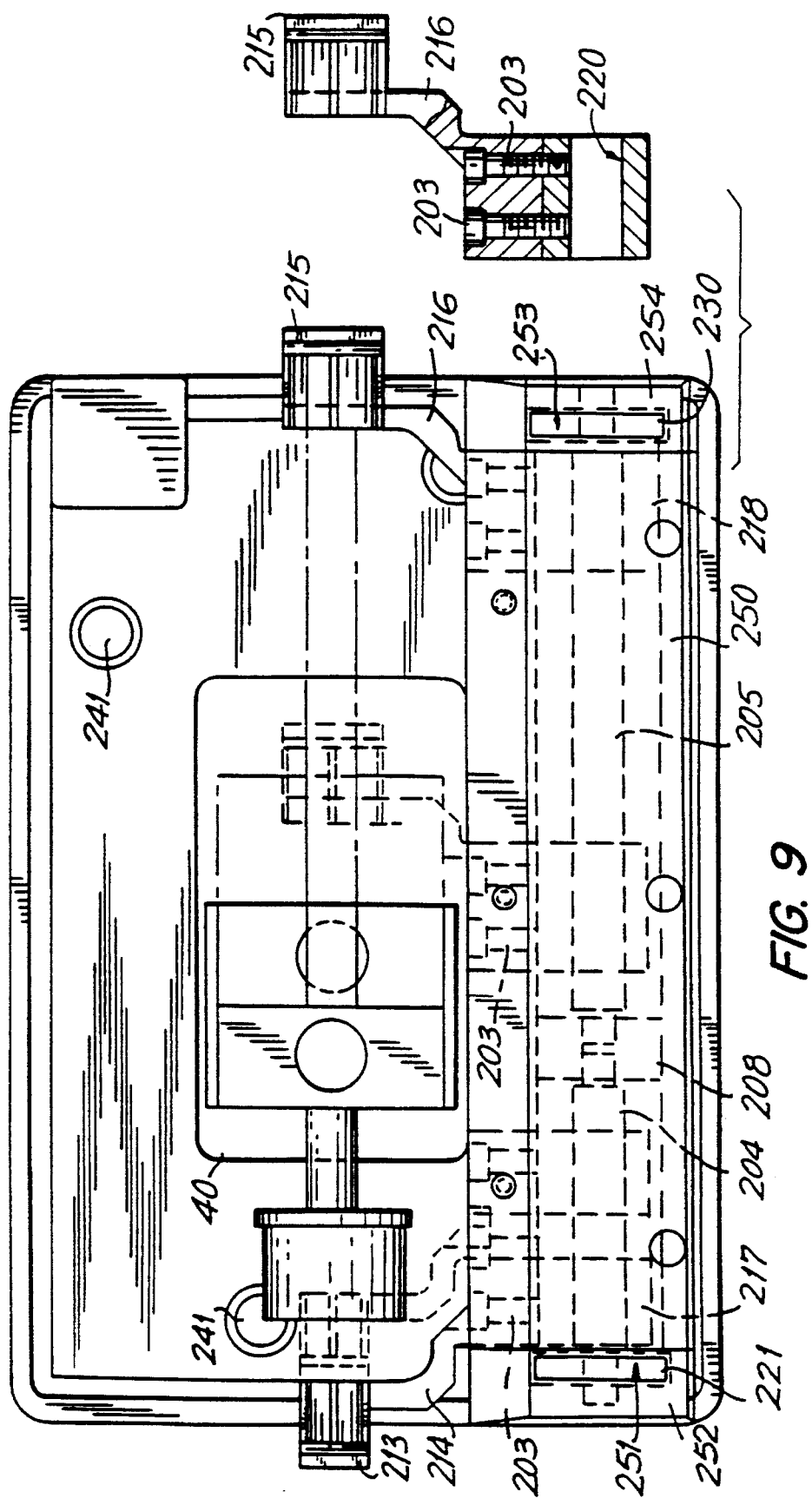
FIG. 9 is a top view of FIG. 8.
Figure 10:
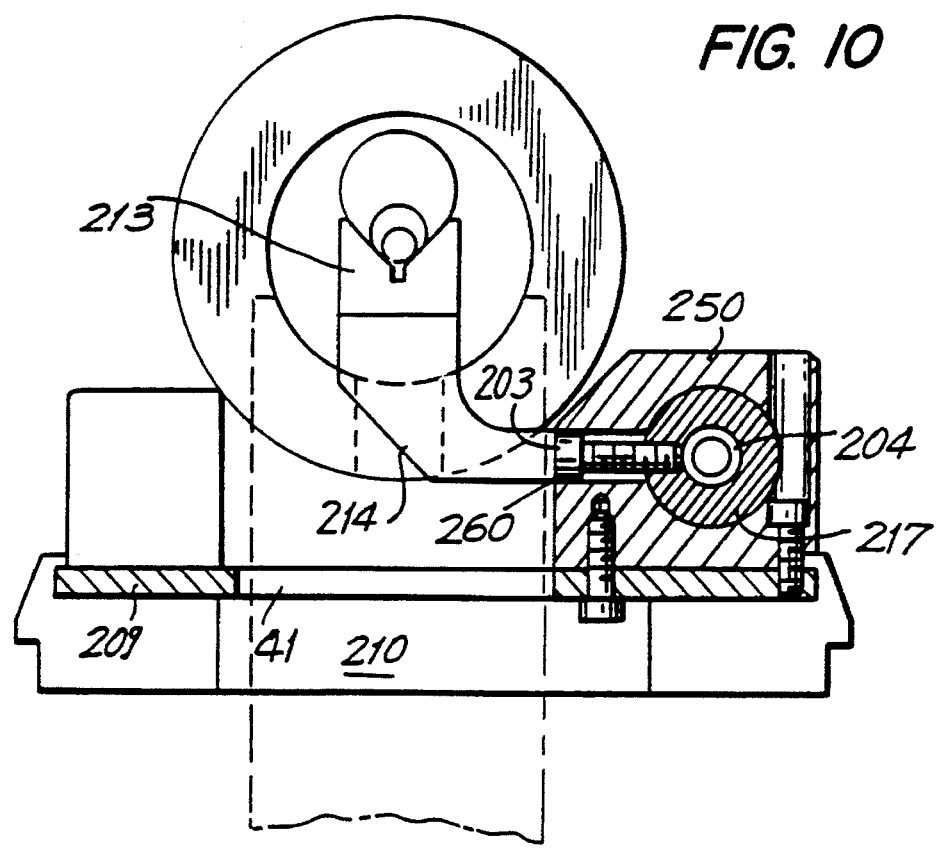
FIG. 10 is an end sectional view taken along line 10—10 of FIG. 8.
Figure 11:
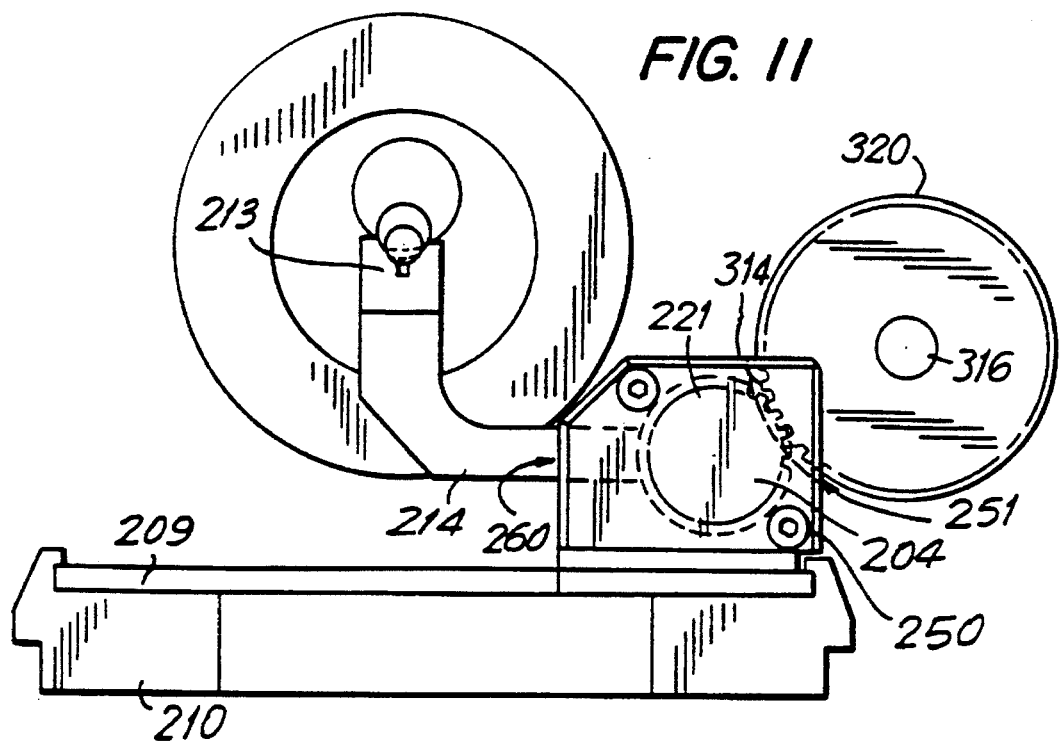
FIG. 11 is an end sectional view taken along line 11—11 of FIG. 8.

An alternate first embodiment of this invention is shown is FIGS. 6 and 7. In this embodiment, positioning unit 11 comprises only one actuator-carriage assembly wherein actuator 124 drives screw 125 on which an internally threaded boss or aperture 126 is assembled integral to carriage 127. Carriage 127 includes bushings 129 and 130. As shown in FIG. 7, when pallet 10 is raised by lift means 8, pins 22 and 23 release the locking means of support members 13 and 15. However, only one of the two bushings 129 or 130 will engage one of pins 35 or 36. Thus, carriage 127 will displace only the support member that is engaged, as it is driven by actuator 124.

To move the other support arm, pallet 10 is lowered and carriage 127 is moved so that the other of the bushings 129 or 130 will engage the other of pins 35 or 36 when pallet 10 is raised again to move the other of support member 13 or 15 to the desired position. Although this embodiment relies upon two succesive operations of lifting and lowering of pallet 10, the same result of placing arms 14 and 16 of support members 13 and 15 for receiving the appropriate workpiece 17 is obtained. This embodiment is appropriate when rapid changes of position are not required.

The positioning unit described in each of these embodiments permits positioning the support members to an infinite number of positions between the minimum and maximum of the range of travel of support members 13 and 15.

Referring to FIGS. 8–15, a second embodiment of the present invention comprises pallet 210 and positioning unit 300. As shown in FIGS. 8–11, pallet 210 includes plate 209, housing 250, and support members 213 and 215. Housing 250 has an elongated aperture 260 along one side of its length that extends along pallet 210. Support members 213 and 215 are respectively connected to arms 214 and 216, which are respectively connected to slide blocks 217 and 218 by screws 203. Arms 214 and 216 extend through and slide along aperture 260 in housing 250. Aperture 260 is preferably located in a wall of housing 250 that is protected so that falling matter, such as metal scraps, waste materials or lubricating fluids that exist commonly in pallet conveyor line operating environments, will not fall into aperture 260 or otherwise interfere with the adjustment mechanisms. For example, a vertical wall, or an overhanging wall may be used.

Slide blocks 217 and 218 are disposed interior to housing 250 and have respective threaded passageways 219 and 220. Threaded bars 204 and 205, rotatably mounted in housing 250, are configured to pass through, mesh with, and engage respectively threaded passageways 219 and 220 so that sliding blocks 217 and 218 translate along threaded bars 204 and 205 as the bars are rotated. Gears 221 and 230 are respectively rigidly connected to threaded bars 204 and 205, interior to housing 250, to provide a means for rotating bars 204 and 205. Gears 221 and 230 are in fixed positions relative to the pallot and are adapted to rotate about the axis of their respective bars and also are preferably located close to the outward ends of their respective bars.

Housing 250 includes two apertures 251 and 253 which are positioned relative to gears 221 and 230 to provide access to gears 221 and 230 to rotate gears 221 and 230.

In the preferred embodiment, bars 204 and 205 are independently rotated so that slide blocks 217 and 218 may be independently moved. Threaded bar 204 is supported at one end by bushing 206 and at the other end by a seat in end 252 of housing 250. Threaded bar 205 is similarly supported at one end by bushing 207 and at the other end by a seat in end 254 of housing 250, in axial alignment with bar 204.

Arms 214 and 216 are preferably provided with a bearing surface that interacts with an opposing bearing surface of housing 250 at the perimeter of aperture 260. The bearing surface of housing 250 provides support for support members 213 and 215, holds the support members in place, and provides a guide surface so that arms 214 and 216 can move along aperture 260 of housing 250 under the control of positioning unit 300. Because the desired movement of arms 213 and 215 occurs in an unloaded condition, i.e., without a workpiece, a smooth metal to metal sliding contact may be made.

In this regard, the weight of the support arm on the housing bearing surface and the contact between the threaded bars and the sliding blocks create forces that substantially prevent the support members from moving inadvertently or unintentionally, once placed in a desired location by the positioning unit. The frictional forces are, however, overcome by the positioning unit which provides sufficient power to rotate the threaded bars to move the support member or members. When the support members are loaded with a workpiece, the static frictional forces increase, thus further ensuring that the support member will remain in its desired location and support securely the workpiece. Thus, the support member is substantially maintained in the position in which it is left by the positioning unit, whether or not it is carrying a workpiece. In an embodiment where the construction of the pallet would provide a static frictional force larger than is desired, a friction reducing material or composition, e.g., polytetrafluoroethylene, may be interposed between the contacting or bearing surfaces to reduce the forces required to move the support members along the aperture 260 or threaded bars 204 or 205.

Slide blocks 217 and 218 also may be provided with a contoured surface that corresponds to the interior contours of housing 250 so that any rotation of blocks 217 or 218 about threaded bars 204 or 205, as would occur with a weight on the support members, is substantially minimized, to add a static frictional force component, and to reduce or better distribute the load bearing forces on the pallet elements. The latter also will reduce wear on the overall pallet mechanism. However, such contoured surfaces should not have tolerances so tight that it will impair translational movement of blocks 217 or 218 or arms 214 or 216 along the longitude of threaded bars 204 or 205, and hence along housing 250 of pallet 210.

In the preferred embodiment the threaded bars have only a motion imparting function and prevent undesired movement of the support members. Moments derived from external forces are discharged as a couple, where one action is discharged on the longitudinal support bearing surface and the other is discharged on the housing. In an alternate embodiment, the threaded bars may have a load-bearing and guiding function in addition to controlling the movement of the support members.

Pallet 210 may be lifted from a position on a conveyor belt by a lifting means (not shown in FIGS. 8–15) and lifting bores 241 and may include an aperture 40 to provide for lifting workpieces off the support members to a workstation and then lowering the workpieces onto the support members from below pallet 210. Lifting bores 241 assist in the proper alignment of pallet 210 as it is raised and lowered between the conveyor and a workstation or positioning unit 300.

Figure 12:
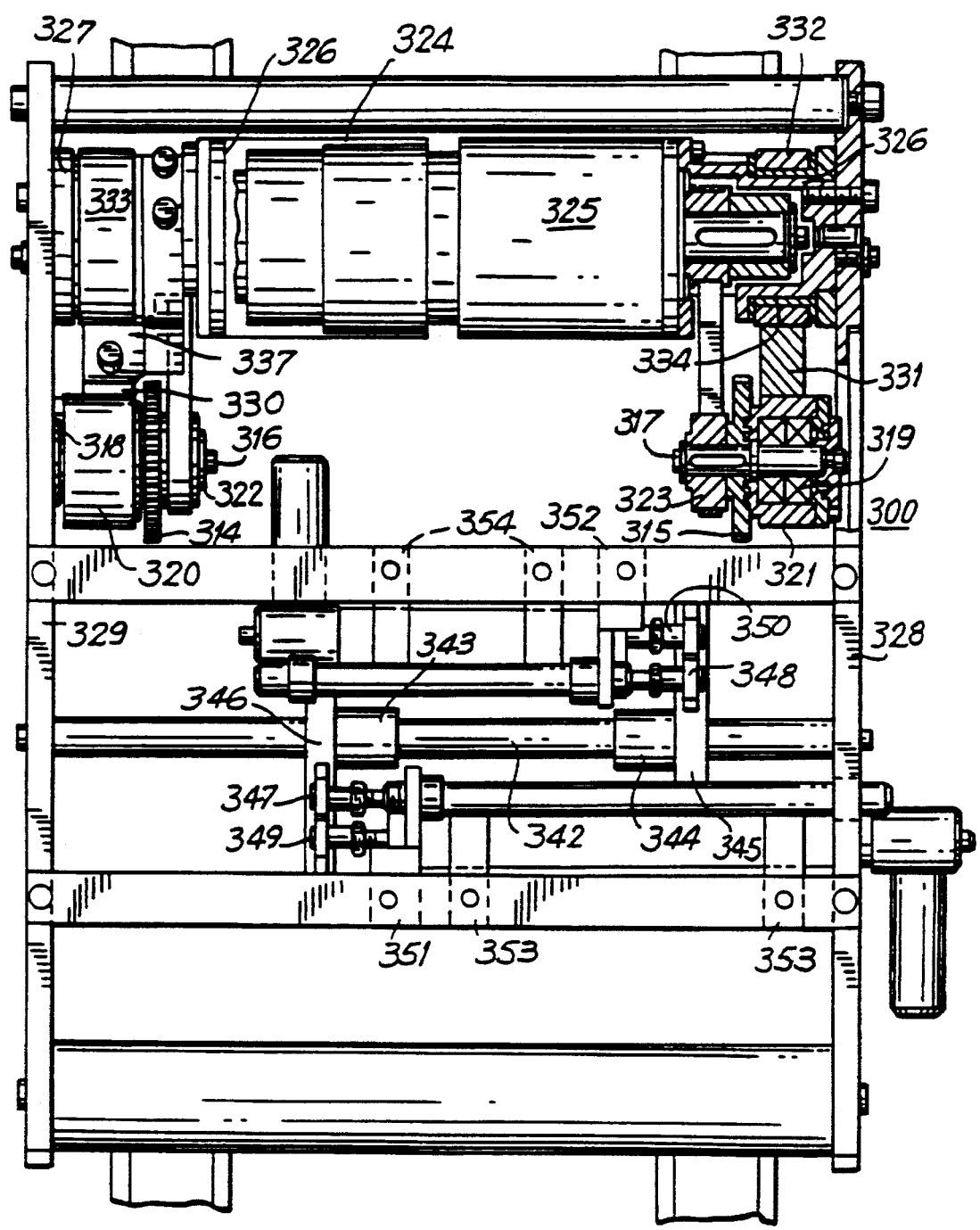
FIG. 12 is a partial sectional top view of a positioning unit of the second embodiment of the present invention.
Figure 13:
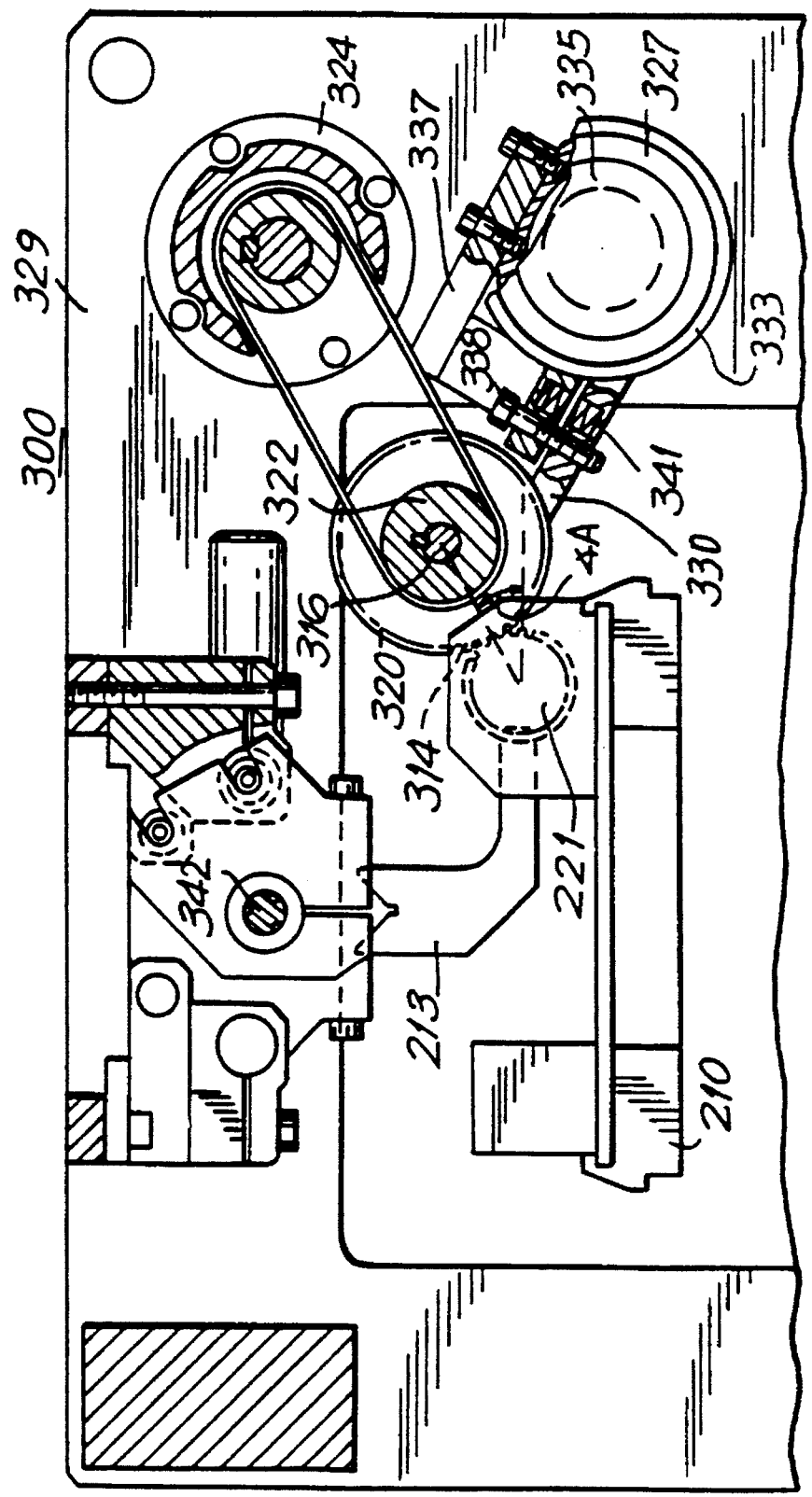
FIG. 13 is a side view of the gear engagement position of a pallet and positioning unit of the second embodiment of the present invention.

Referring to FIGS. 11–15, positioning unit 300 includes toothed gears 314 and 315 that are disposed on either side of the longitudinal axis of the conveyor that are adapted for passing through apertures 252 and 253 to contact and engage toothed gears 221 and 230 of pallet 210. Referring to FIG. 13, in the preferred embodiment, gears 314 and 315 are arranged to contact gears 221 and 230 at an angle A relative to the vertical axis. Angle A provides for a force component that facilitates insertion of the teeth of the cooperating gears. An angle of contact A of about 50 to about 70 degrees relative to the vertical axis, preferably about 60 degrees, have been found to be satisfactory.

Gears 314 and 315 are mounted on shafts 316 and 317 which are supported by bearings 318 and 319 in housings 320 and 321 of gear arms 330 and 331. On the free ends of shafts 316 and 317 are toothed flywheels 322 and 323, which are connected to motor and reduction gear drives 324 and 325 by belts, thus forming a transmission. The belt transmission provides for delivering the torque to gears 314 and 315 needed to overcome the static frictional forces. Drive units 324 and 325 are connected to one end of side support members 326 and 327, which are fixed to lateral frame plates 328 and 329. The motors are preferably DC motors having a tachometer and encoder for determining and controlling speed and angular position control of the motor drive shaft. Preferred motors include, for example, Parvex model RE 220 motors manufactured in France. The drive and belt transmission units are conventional devices known to those of skill in the art, and accordingly are not discussed further here.

Gear arms 330 and 331 have collar ends 332 and 333 which journal by means of bushes 334 and 335 on external surfaces of side support members 326 and 327. Arms 330 and 331 also are fixed to auxiliary frame plates (see plate 337 in FIG. 13) by means of registering (see screw 338 in FIG. 13). Springs are interposed between arms 330 and 331 and their respective frame plates (see spring 341 in FIG. 13) in order to have a controllable force and an adapting motion during the engagement phase of gears 221 and 230 of pallet 210 and gears 314 and 315 of positioning unit 300. The adapting motion provides for engagement of the gears before applying motor torque to rotate the gears.

Figure 14:
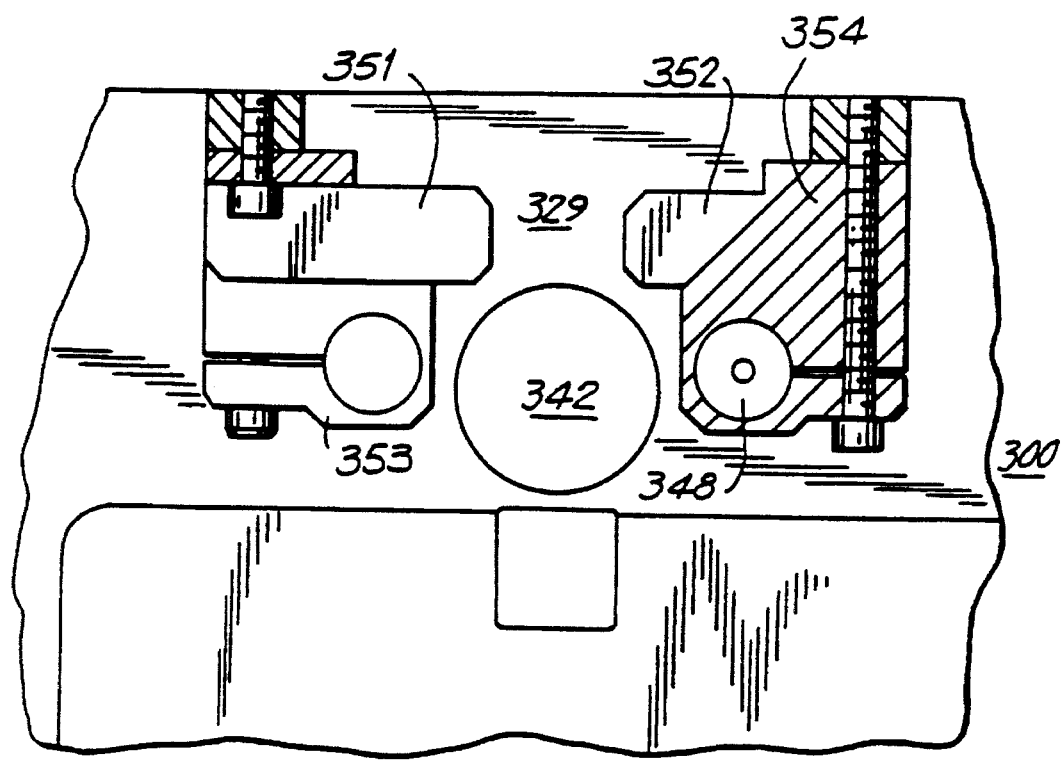
FIG. 14 is side view of the cylinder and transducer elements of FIG. 12.
Figure 15:
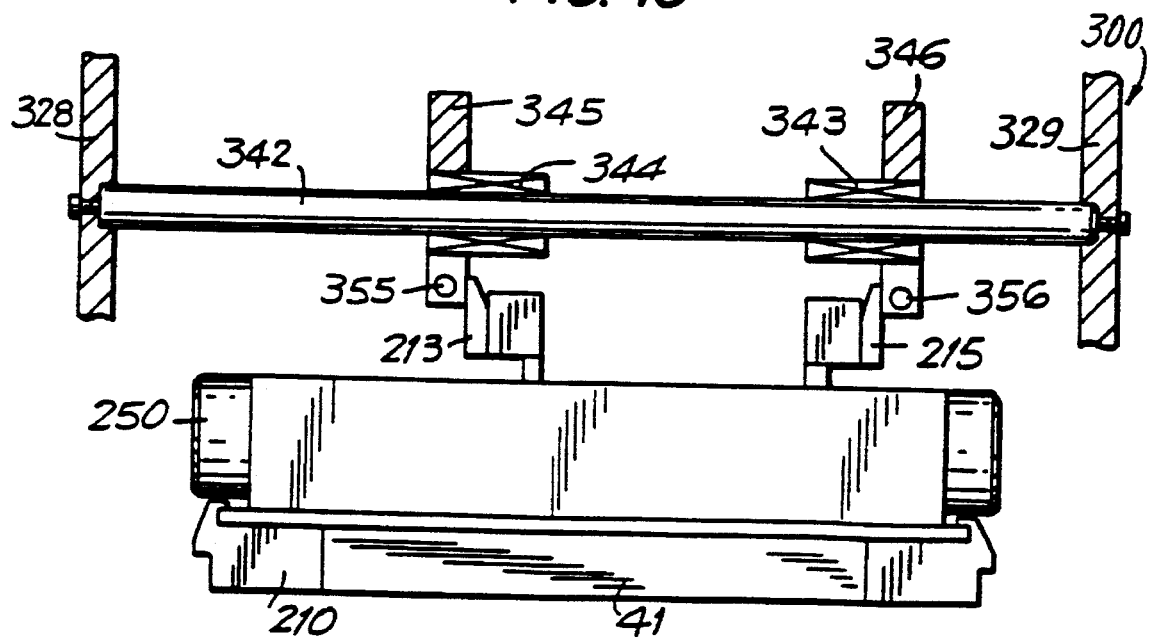
FIG. 15 is a front view of FIG. 14.

Referring to FIGS. 14 and 15, positioning unit 300 is provided with the ability to determine the relative location of the support members of a pallet, to compare the determined locations to the desired locations for the next workpiece to be loaded onto the pallet, and to adjust the position of one or more of the support members as necessary. Shaft 342 is aligned with workpiece support arms 214 and 216 of pallet 210 and crosses the conveyor with its ends supported in side plates 328 and 329. Shaft 342 includes two movable sleeves 343 and 344 which have appendages 345 and 346 for connecting to piston rods 347 and 348 and linear measurement transducers 349 and 350 (piston rods 347 and 348 and transduceres 349 and 350 are shown in FIG. 12). Pistons 349 and 350 are connected to frame arms 351 and 352. Linear measurement transducers 349 and 350 are connected to the frame by support means 353 and 354. Such linear transducer devices may be, for example, model no. LCPX, supplied by Penny & Giles, of Blackwood, Glent, UK.

The position of supporting members 213 and 215 of pallet 210 may be determined by positioning unit 300 as follows. Movable sleeves 343 and 344 on shaft 342 are advanced from a predetermined outward position by cylinders 347 and 348. Advance of a given sleeve is stopped when the sleeve appendage contacts the outward surface of the associated support member. A contact sensor on each of appendages 355 and 356 may be used to determine when contact is made.

During the advance of appendages 345 and 346, associated linear transducers 349 and 350 move rigidly with sleeves 343 and 344 and thus provide signals corresponding to the measured or determined distances from the predetermined outward positions to the location of the sleeve. When advance of the sleeve is halted, the signals correspond to the distance between the point of contact of each appendage with a support member and the predetermined position, thus indicating the locations of the supporting members on the pallet. The distance signals, one for each supporting member, are then provided to the microprocessor device that controls the pallet movement and the positioning unit to adjust the support members.

The microprocessor then can process the signals and determine the distance and direction each support member must be translated, if at all, to move the support members from the determined locations to the desired locations for the next workpiece that is to be placed on that pallet. The microprocessor then can send instructions to motor drive units 324 and 325 to rotate accordingly gears 314 and 315 to effect the desired movement. Preferably, the microprocessor converts the measured distances into encoder impulse control signals to be inputted to the motors, which signals are related to the number of turns that the threaded bars 304 and 305 on pallet 210 must rotate. Thus, it is possible that support members 213 and 215 can be moved asynchronously or synchronously in the same or different directions as necessary.

In the preferred illustration of the second embodiment of the invention, pallet 210 is lifted off the conveyor to a predetermined height at which point gears 314 and 315 of positioning unit 300 engages gears 221 and 230 of pallet 210. In an alternate illustration, positioning unit 300 could be lowered onto pallet 210 from above while pallet 210 is advancing on the conveyor, or held in place. In yet another embodiment, because of the nonvertical angle of contact between the gears of the pallet and the positioning unit, the positioning unit could be maintained in horizontal alignment with the pallet to be adjusted and translated horizontally into position.

The means for determining the location of the support members could be incorporated into any embodiment of the invention, for example, the positioning unit of the first embodiment (not shown) by placing a contact sensor on an appendage to a carriage such as a bushing, placing the carriage at an outermost position and moving the carriage inwardly until the carriage appendage contacts the associated support member, more preferably, a portion of the support member configured to cause the carriage to stop in alignment for engagement with the pallet. Then, the positioning unit can engage pallet and make the appropriate adjustment based on the determined distance and the desired location of the support members. Following adjustment and disengagement of the pallet, the carriage would be returned to its outermost position for the next pallet support member.

The second embodiment of the present invention has several advantages over the first embodiment, including, for example, an adjustment mechanism on the pallet that is less susceptible to damage or interference from dirt, less susceptible to wear on the support members in that the forces are exerted on the toothed gears rigidly mounted in the pallet rather than on the support member itself, a design that eliminates the locking means and its complexities, support members that can be moved independently in an improved manner, and, in the event it becomes necessary, support members that can be adjusted manually by rotating the gears fixed on the pallets with a tool such as a screwdriver.

Pallet 10 (or 210) may include an aperture adapted to permit a piston type lifting device for lifting workpiece 17 from pallet 10 (or 210) to a workstation, and then to lower the workpiece back to its rest position for transport. Alternately, the workstation may include gripper means for grasping the workpiece from above to transfer the workpiece to and from the workstation.

One skilled in the art will appreciate that the present invention can be practiced by other than the described embodiments, which are presented for purposes of illustration and not of limitation, and the present invention is

We claim:

1. A method of automatically conveying armatures in an armature production line by means of a conveyor having a plurality of pallets including first and second support members, the first and second support members being spaced a distance apart, the distance between the first and second support members being adjustable, the method comprising the steps of:

a) sequentially moving the plurality of pallets, while empty, to a location in the production line so that each one of the plurality of pallets and a positioning unit are aligned in turn;

b) bringing engaging means of the positioning unit into engagement with a first one of the plurality of pallets;

c) operating the engaging means by driving means of the positioning unit to translate the first support member relative to the second support member to adjust the distance between the support member to suit an armature to be conveyed;

d) disconnecting the first one of the plurality of pallets and the engaging means;

e) moving the first one of the plurality of pallets and the positioning unit apart whilst maintaining the adjusted distance between the first and second support members;

f) placing an armature on the first and second support members of the first one of the plurality of pallets so as to rest thereon;

g) conveying the first one of the plurality of pallets with the armature thereon by means of the conveyor sequentially to a workstation;

h) sequentially removing the armature from the first one of the plurality of pallets for performance of an operation thereon at the workstation;

i) sequentially replacing the armature on the first one of the plurality of pallets after the operation;

j) sequentially conveying the first one of the plurality of pallets with the armature thereon away from the workstation; and k) repeating steps (a) through (j) with subsequent ones of the plurality of pallets.

2. The method as defined in claim 1 further comprising steps, after step (d) and before step (e), of:

repositioning the positioning unit relative to the first one of plurality of pallets;

bringing the engaging means of the positioning unit into engagement with the first one of the plurality of pallets; and operating the engaging means by driving means of the positioning unit to translate the second support member relative to the first support member to adjust the distance between the first and second support members.

3. The method as defined in claim 2 wherein each one of the plurality of pallets further comprises a portion defining a central aperture, and wherein the steps of translating the first and second support members relative to each other adjusts the first and second support members so that they are centered on the central aperture.

4. The method as defined in claim 1 wherein step (a) comprises moving each one of the plurality of pallets into alignment with the positioning unit.

5. The method as defined in claim 1 wherein each one of the plurality of pallets further comprises a portion defining a central aperture, and wherein steps (h) further comprises extending a lifting arm through the central aperture to engage the armature and remove the armature from the first and second support members; and step (i) further comprises retracting the lifting arm through the central aperture to disengage the armature and replace the armature upon the first and second support members.

* * * * *